C. GOODYEAR.
Manufacture of India Rubber Goods.
No. 3,462. Patented March 9, 1844.
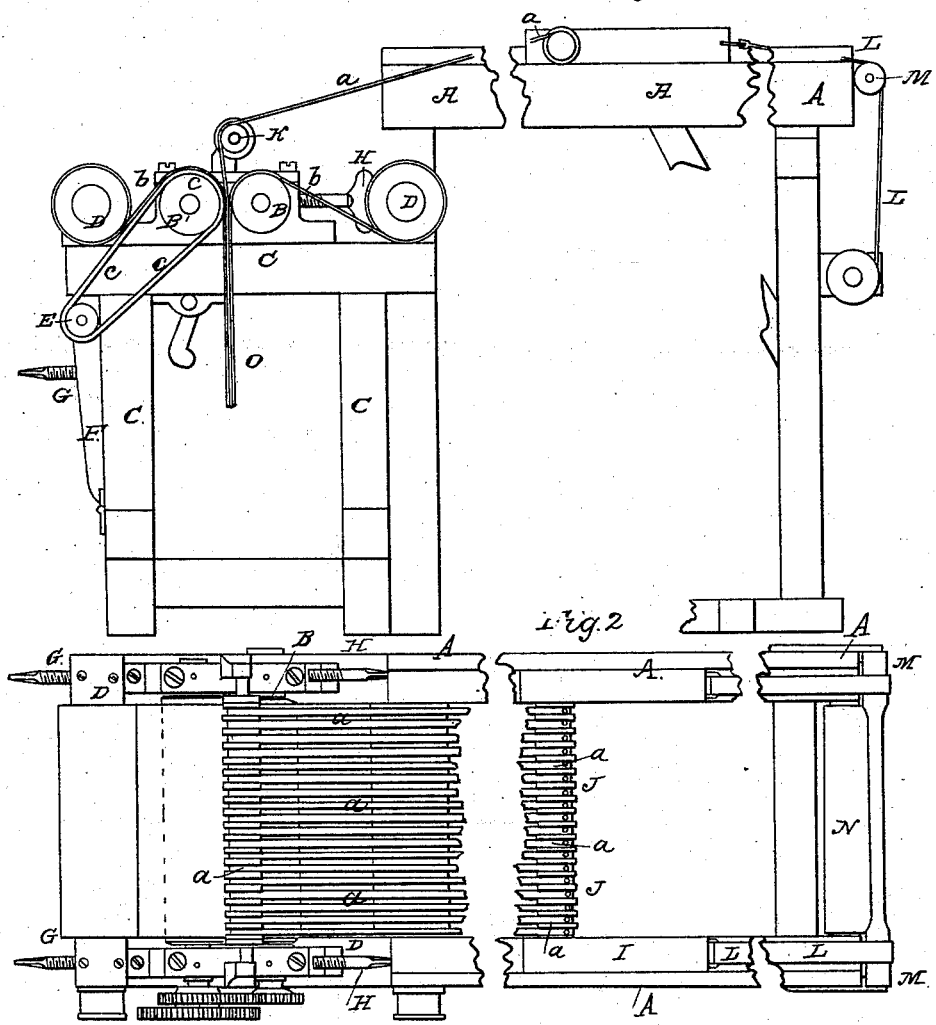

UNITED STATES PATENT OFFICE.

CHARLES GOODYEAR, OF NEW YORK, N. Y.

IMPROVEMENT IN INDIA-RUBBER FABRICS.

Specification forming part of Letters Patent No. 3,462, dated March 9, 1844.

*To all whom it may concern:*

Be it known that I, CHARLES GOODYEAR, of the city of New York, in the State of New York, have invented a new and useful manner of constructing a machine for manufacturing what I have denominated "Corrugated or Shirred India-Rubber Goods;" and I do hereby declare that the following is a full and exact description thereof.

I have fully described the nature of what I denominate "corrugated or shirred india-rubber goods" in a specification thereof intended to constitute an application for Letters Patent therefor, and which it is intended to file in the Patent Office simultaneously with the present instrument. In that specification I have given the manner in which said goods are manufactured by hand; but the process is greatly facilitated by means of the machine which I am now about to describe.

In the accompanying drawings, Figure 1 is a side elevation, and Fig. 2 a top view, of a part of my machine, the stretching-frame A A, which may be of great length—say eighty or ninety feet—being represented as cut off, and showing only its two ends and a part of its middle portion.

B B' are two calender-rollers, usually made of metal, between which the two laminæ of cloth coated with india-rubber cement and the stretched narrow strips of india-rubber are to pass. These rollers and others to be described may be supported on a separate frame, C C, placed at one end of the stretching-frame A A. In Fig. 1 the frame C C and its appendages are shown in a vertical section from front to back through the middle. D D are two rollers around which the cloth is to be wound, which is to be carried from them over the two rollers B B, and is to pass down between them, embracing the stretched strips a a a of india-rubber between them. b b represent the cloth in its passage from the rollers D D over those marked B B.

Around the roller B', and around a tightening-roller, E, passes an endless apron, c c c. This endless apron consists of gum-elastic cloth, or of woolen or other yielding material, its use being to cause the two laminæ of cloth which have been coated with india-rubber cement to be brought into contact between the stretched threads of india-rubber.

F is a part of a tightening-frame borne out by screws G for tightening the endless apron c c. H H are the screws for regulating the distance apart of the calender-rollers.

I I is a sliding frame, which rests upon the longitudinal pieces or cheeks of the stretching-frame A, along which it may pass from end to end, being kept from lateral motion by suitable rabbets. To a cross-piece, J J, of this frame one end of each of the strips a a a is attached in such manner as that said strips shall stand parallel to and equidistant from each other. From this sliding frame they are carried over a grooved roller, K, which preserves their parallelism. To stretch the strips a a, straps L L are attached to the sliding frame I and pass over rollers M M at the rear end of the machine and down around the ends of the shaft N, upon which they are wound. By turning the shaft N the narrow strips of india-rubber a a may be stretched to any required extent, and when the shirred goods are being formed the frame I I is allowed to advance toward the calender-rollers with the same speed with which the peripheries of those rollers move and carry the cloth from the rollers D D. The corrugated material, as it is formed, may be allowed to descend after leaving the calender-rollers, as shown at O.

Instead of the foregoing arrangement, I sometimes form the cross-piece J J of the sliding frame so as to constitute a grooved roller, and I join the two ends of each of the strips a a together, forming them each into an endless band. These strips then pass round the roller J J and round that marked K and under the calender-roller B. The corrugated cloth, as it passes from the calender-rollers, instead of descending, as at O, is in this case conducted round under the calender-roller B to the roller J J. The distance between the roller J J and the calender-rollers must under this arrangement be equal to half the length of the corrugated goods in the stretched state. The manufactured article is, when thus made, to be removed from the machine by cutting it across. Under this last arrangement the frame I I does not approach the calender-rollers during the process, the rollers J J merely revolving after the strips upon it have received the proper tension by the action of the straps L L.

Fig. 3 shows a pawl on the shaft N for preserving the tension of the threads $a$ $a$.

The gearing by which the calender-rollers B B are moved does not differ from such as is generally used for a like purpose. To the construction of this part of the machine I do not make any claim, nor do I claim the use of the calender-rollers, similar rollers having been employed in the manufacturing of india-rubber goods and for other purposes; but What I do claim as new in the above-described machine, and wish to secure by Letters Patent, is—

The combining with the calender-rollers an elastic endless apron, such as is represented at $c$ $c$, and a stretching-frame, with its appurtenances, such as is represented at I I, for the purpose of giving and preserving to the strips or threads their proper tension and allowing them to pass between the laminæ of coated cloth or other material, so as to produce the corrugated or shirred goods by an operation of the respective parts, substantially as herein set forth.

CHARLES GOODYEAR.

Witnesses:
  THOS. P. JONES,
  B. K. MORSELL.